United States Patent Office 2,784,410
Patented Mar. 12, 1957

2,784,410

WELDING HELMET AND LENS CONTROL

Paul Gentz, Harper Woods, Mich.

Application August 12, 1955, Serial No. 527,969

6 Claims. (Cl. 2—8)

This invention relates to welding helmets and more particularly to a novel control for the smoked lens therein whereby the same may be vertically elevated when desired out of registry with a conventional safety glass in the said helmet.

It is the object of the present invention to provide in conjunction with a welding helmet having a transparent safety glass in its front wall, of a framed smoked lens normally registerable with said glass and adapted for guided vertical movement upwardly out of registry with said glass.

It is the further object of the present invention to provide a chin operated toggle mechanism upon the interior of the helmet and connected with the frame glass whereby with little effort the said lens may be easily elevated to permit the user's clear viewing merely through the transparent safety glass of the helmet.

It is the further object of the present invention to provide a novel cam guide and latch construction for retaining the elevated lens against downward movement together with additional means under the control of the user's chin for releasing the said latch and permitting automatic downward movement of the framed lens into registry with the safety glass.

It is the further object of the present invention to provide a novel chin operated arm control in conjunction with a novel form of toggle linkage associated with a vertically moveable means for effecting a quick acting upward movement of the framed lens.

Figure 1:
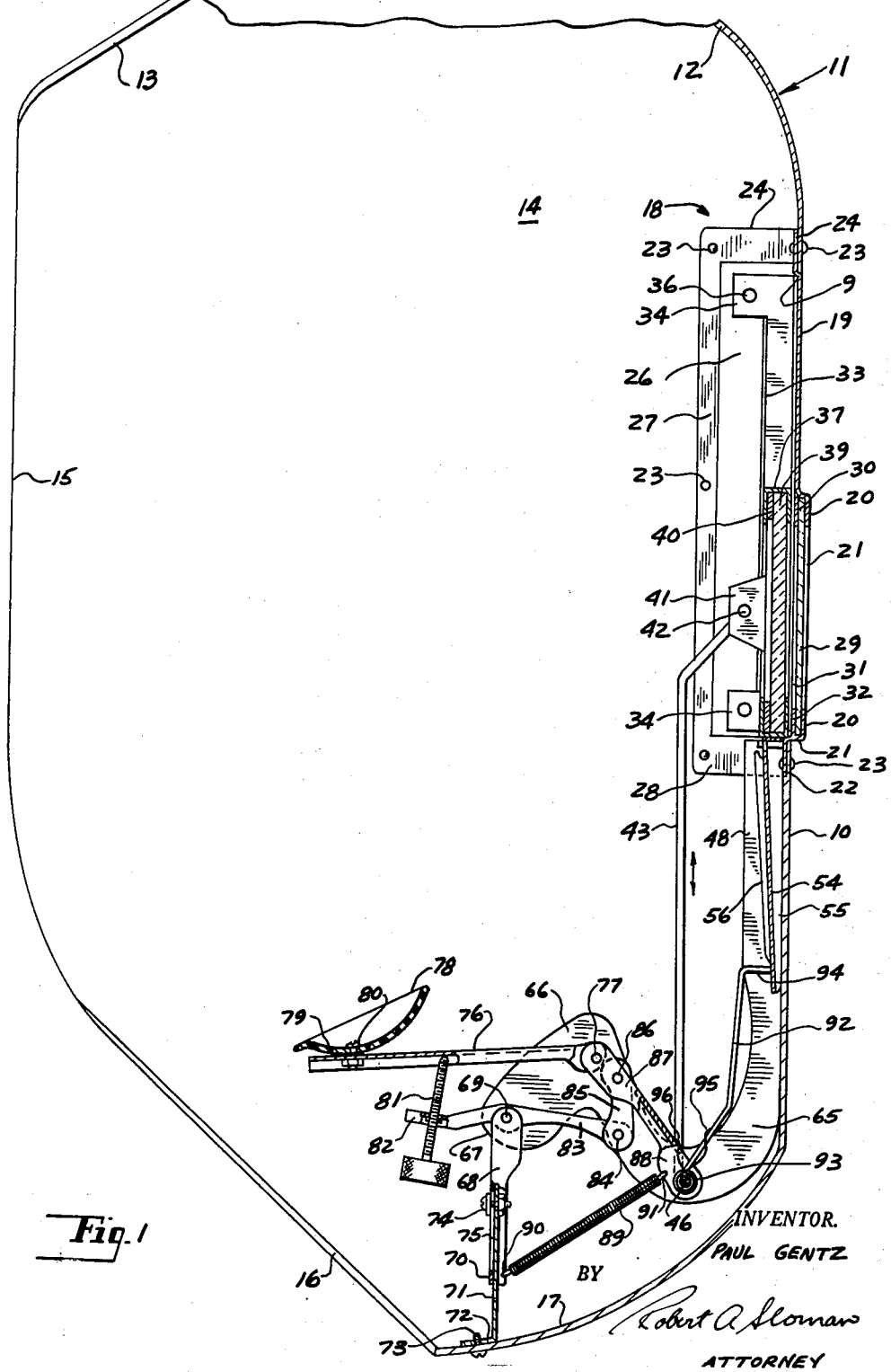
Figure 2:
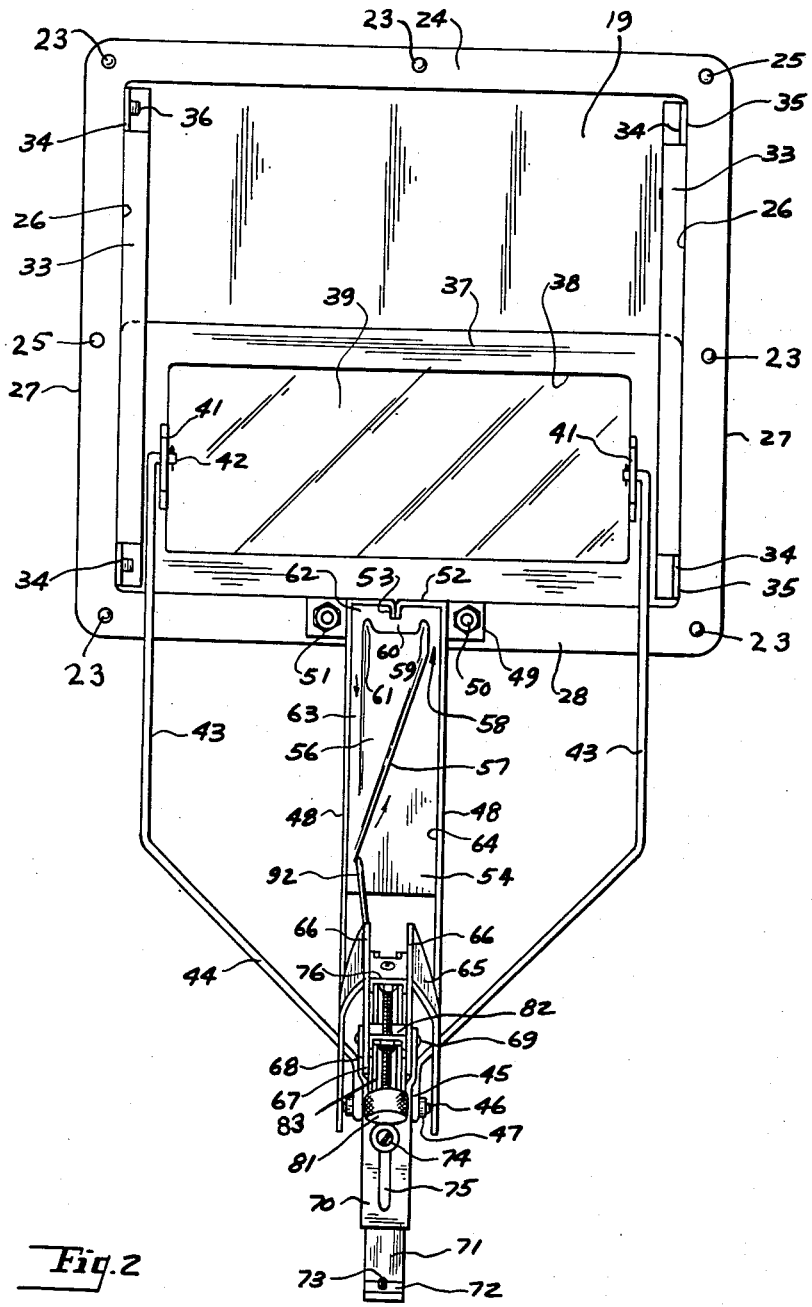

These and other objects will be seen from the following specification and claims in conjunction with the appended drawings, in which:

Fig. 1 is a fragmentary vertical section of a welding helmet illustrating the present lens control therefor; and Fig. 2 is a rear elevational view of the frame and smoked lens and lens control shown in Fig. 1.

It will be understood that the above drawing illustrates merely a preferred embodiment of the invention and that other embodiments are contemplated with the scope of the claims hereafter set forth.

*Frame construction*

Referring to Fig. 1, there is shown one form of welding helmet to which the present lens control is adapted, it being understood that the present lens control would be adaptable to various types of helmets wherein it is desired to effect vertical movements of a smoked lens with respect to a viewing area.

The present helmet, which is a welding helmet, generally designated at 11, includes the forwardly arranged dome-shaped portion 12 which is partially broken away for illustration and which is adapted for protective positioning over the forward portion of the user's face and head, and which is adapted for supported positioning upon the user's head by a suitable adjustable and pivotal strap mechanism, which forms no part of the present invention, and accordingly, is omitted from the illustration.

The helmet in the upright position shown includes a cut-away edge as fragmentarily designated at 13, and this edge, which is substantially convex, terminates at its opposite ends in the substantially upright edges 15 which form the rear edge portions of the upright formed side walls 14 which protect the sides of the user's head. The edges 15 towards their lower ends are curved downwardly and inwardly, as designated at 16, to provide a clearance forwardly and below the user's chin adjacent his neck. The helmet also includes an upright convex front wall portion 19, and this terminates at its lower end in the downwardly and inwardly curved bottom wall 17. The above description pertains to one form of welding helmet, it being distinctly understood that the present invention may be applied to other types of helmets or welding helmets of different form without departing from the scope of the present invention.

The present helmet may be regarded as a hood adapted to protect the user's head, particularly during a welding operation. The front wall 10 of the hood has a rectangular central aperture 9 formed therethrough, and projected forwardly through said aperture is a hollow generally rectangular frame, 18.

Said frame has an upright front wall 19 which is projected through aperture 9, and in view of the curved formation of the said front wall of the hood or mask, the outer edges of the said frame project substantially forward of the adjacent portion of the hood. Intermediate the top and bottom of the frame and in its front wall there is formed a forwardly arranged upright offset 20 which is provided with a rectangular opening 21, said offset at its lower end terminates in the inturned bottom wall portion 21 which terminates in the downwardly extending horizontally arcuate flange 22 registerable with the interior curved front wall portion of the mask and secured thereto along the edge of the helmet which bounds the lower portion of said aperture. The said flange is secured by a series of fastening means such as the rivets 23.

The above frame includes an inturned internal peripheral flange which is registerable with the interior wall of the hood bounding said aperture and is secured thereto by a series of rivets 23 shown in Fig. 1.

The said peripheral flange includes the arcuate bottom wall portion 28 which forms a continuation of the sectioned illustration 22 of the flange. This bottom wall flange element 28 terminates as shown in Fig. 2 in the opposed upright flanges 27. These in turn at their upper ends terminate in the concave horizontally extending flange 24.

As shown in Fig. 2, there are a series of transverse apertures 25 formed through the said peripheral flange 24, 27, 28, which provide the means of securing the said flange to interior wall portions of the hood adjacent its aperture as by the rivets 23.

Upright flanges 27 are angularly curved outwardly to correspond to the interior shape of the mask and project from the upright internal wall portions 26 which define the side walls of a box-like enclosure within which the upright channel guides 33 are positioned in opposed relation. These interior side walls 26 terminate in the right angularly related front wall 19 to thereby complete the frame construction.

Mounted within offset 20 in the front wall of frame 19 there is positioned adjacent aperture 21 the stationary transparent glass 29. This glass is secured in position along its top edge by the transverse strip 30 which is suitably secured to adjacent portions of the frame as by welding. The side and bottom marginal portions of the glass are engaged by the upright U-shaped spring steel strip 31—32.

*Smoked lens guides*

This strip is retained in position and operatively against the side and bottom wall portions of glass 29 by the pair of upright opposed channel guides 33. The right hand channel guide in Fig. 2 includes at its opposite ends the right angularly related outturned flanges 35 which register with interior portions of wall 26 and are suitably secured thereto as by welding at 35. The other channel guide 33 also includes the struck-out flanges 34 in registry with wall 26. However, these are secured to upright wall 26 as by the fasteners or screws 36 so that the said channel guide may be removed if desired to permit removal of the framed smoked glass as desired.

A continuous channel frame 37 of substantially U-shape in cross-section encloses and retains the rectangularly shaped clouded or smoked protective glass 39.

The opposite upright ends of channel frame 37 are slidably positioned within the opposed channels 33 for guided vertical adjustments, said channel frame having a transverse aperture therethrough as designated at 38. As shown in Fig. 1, a suitable fiber gasket 40 is peripherally interposed between portions of lens 39 and the channel frame 37 for snugly retaining the said lens within the frame and for protecting the said lens against shock.

Opposed ears 41 project outwardly in parallel relation from rear portions of lens frame 37 and are transversely apertured to cooperatively receive therein the opposed inturned ends 42 of the vertically movable means 43.

In the preferred embodiment of the invention these vertically movable means consist of a pair of upright substantially non-flexible wires which at their lower ends converge angularly inward as at 44 and with their lower ends being looped as at 45 in parallel spaced relation for mounting upon the transverse pin or bolt 46 and retained thereon as by the securing means 47 for connection to a toggle linkage mechanism, hereafter described.

Toggle linkage support

For the said toggle linkage mechanism and the operating means whereby the said framed lens is vertically adjusted out of registry with transparent glass 29, there is provided an upright central support which includes a pair of upright support elements 48 which are positioned adjacent the central portion of the front wall of the hood upon its interior, and at their upper ends have outturned flanges 49 which are secured to lower central portions of the frame as by the bolts and nuts 50 and 51, or equivalent fastening means.

The upper ends of support elements 48 terminate in the opposed inwardly directed top wall elements 52 which are downturned at 53 in engaging relation and which provide a stop means within the upper portion of the said support for engagement with a control latch relative to notch 60, hereafter described in further detail.

The upright retainer 54 has upon its opposite marginal edges the inwardly directed parallel tapered flanges 55 which are nested between the supports 48 and suitably secured thereto as by the welds 64. As shown in Fig. 1, the retainer 54 is inclined upwardly and downwardly for cooperation with an inverted A-shaped cam guide 56 which is mounted thereon and which forms a part thereof as shown in Fig. 2.

The cam guide includes the upwardly and outwardly inclined cam guide surface 57 for guiding the upward movements of the offset 94 of the latch arm 92. As said offset 94 reaches the upper portion of the inclined wall 57, it moves into the slot 58 defined between the side edge of cam guide 56 and the right hand support element 48. At the extreme upward position of the said offset 94 and by virtue of a spring biasing of the latch arm 92 continuously to the left, the said offset moves laterally over the upright projection 59 which forms a part of the cam guide 46 at its upper end and which is spaced from a similar projection 61 upon the opposite side of said cam guide, thereby defining between said elements 59 and 61 the depressed offset retaining notch 60.

In the operation, as will be described in detail, the offset upon reaching the upper end of slot 58 is biased to the left and will engage the stop 53 and drop down into the notch 60 at the top of retainer 54. This will mechanically hold the latch arm 92 in an elevated position. As the said latch arm is secured at its lower end to the lower end portions of the vertically movable means 43—44—45, it follows that the said latch arm will thus hold the said vertically movable means in its elevated position.

The very next time the toggle mechanism hereafter described is activated tending to raise the vertically movable means, the offset of the latch arm will be elevated out of notch 60, and in view of its spring-biasing as shown at 95 and 96, Fig. 1, will move laterally over projection 61 into the groove 62 at the upper end of slot 63. This slot runs out at its lower end into the top surface of cam guide 57 and accordingly provides a guide by which the latch arm and its offset are free to move downwardly by gravity and under the action of coiled spring 89, hereafter described, back to the inoperative position shown in Fig. 2, ready for the next activation of the toggle mechanism.

The lower ends of the support elements 48 extend rearwardly outwardly as at 65 and converge partially joining the formed upright support elements 66 which are arranged in parallel spaced relation and terminate in the lower end portion 67, best illustrated in Fig. 1.

The end portion of the support element 66 are secured in spaced relation from the bottom wall 17 as by the extensible standard shown. This standard includes the vertically adjustable channelled member 68 whose bifurcated upper end extends around the outer surfaces of the support elements 66 and is fixedly secured thereto by the rivet 69.

The lower end 70 of the said channelled member 68 has an upright transverse slot 75 therethrough adapted to cooperatively and adjustably receive the bolt and nut 74 which is secured to the upright plate 71, also forming a part of the said standard. The lower end of plate 71 terminates in the foot 72 which is secured by the fastener 73 to the bottom wall of the said hood or helmet. As helmets vary in shape and contour and dimension, it is desirable that the said standard be vertically extensible and by means of the fastener 74 may be secured in the desired position of extension as will effectively and rigidly support the free ends 67 of the support element 66 in parallel spaced relation upon and within the said mask.

Toggle linkage and chin operator

The present vertically movable means 43—44—45 by which the framed lens 39 is vertically adjusted within the guides 33 is joined at its lower end as by the pin 46 to a toggle mechanism.

There is provided an elongated channelled arm 76 which is pivotally mounted at its forward end upon the transverse rivet 77 which extends between the support elements 66 and is mounted thereon. Upon the outer or rear end of arm 76 there is provided a concave formed chin engaging cup 78 which has a series of transverse apertures 79 therethrough to provide for the escape of any accumulated moisture from the user's chin, and which is secured in position on the said arm by the fastener 80.

The substantially upright adjusting screw 81 is adapted to engage a central under surface portion of arm 76 upon a downward thrust applied thereto by the user's chin, said screw being projected threadedly up through the outer end of the operating lever 82 which is pivoted intermediate its ends upon the pin 69 which extends transversely across support elements 66 and is mounted thereon. This pivot point or pin 69 also corresponds to the joining of the extensible standard element 68 to the said support elements 66. Accordingly, the lever 82 is pivotally mounted upon a rigid support which extends down through the said extensible standard.

The opposite end of the lever as at 83 projects loosely between support elements 66 and at its free end it is pivotally connected by the transverse pin 84 to the lower end of the short link 85. The upper end of said link is pivotally connected as by the transverse pin 86 to a portion of the operating arm 87 adjacent the pivotal connection of said operating arm at 77. The said operating arm 87 is of a channel construction for rigidity and its forward end is bifurcated as at 88 and is transversely apertured to be interconnected with and receive the transverse pin 46 whereby the lower ends 45 of the vertically movable means are interconnected by the said pin 46 to the operating arm 87.

It will be noted that the pivotal point 86 is intermediate the pivotal points 46 and 77, but much closer to pivotal point 77, to thereby achieve certain mechanical advantages. For example, the downward thrust of the chin projected through arm 76 and operating through adjusting screw 81 produces a counter-clockwise rotation of lever 82. Accordingly, there is an upward vertical movement of the short link 85 to thereby transmit an upward pivotal movement of the operating arm 87 about point 77 to thereby effect a prompt and forceful upward movement of the vertically movable means above described for elevating the framed lens 39.

Coiled spring 89 is anchored at 90 to the standard 70—71, and at its opposite end at point 91, is secured to the forward end of operating arm or lever 87. Said spring normally resists upward movement of the vertically movable means 43—44. Furthermore, upon disengagement of the offset 94 from notch 60, and wherein the said offset is positioned at the upper end of slot 63 as at 62, then the said spring 89 is effective for forcefully moving downward the said vertically movable means and the lens 39 back to the initial position shown in Fig. 2.

The said latch 92 is looped at 93 at its lower end and is loosely positioned over the pivot pin 46 between the spaced ends or bifurcations 88 forming a part of arm 87. The said latch is normally maintained in an upright position by means of a coiled spring which extends loosely around pin 93 with one end of the spring bearing against arm 87 as at point 96 and with the other free end of the spring extending upwardly and around at 95 an intermediate portion of the latch arm 92, not only biasing the latch arm into continuous engagement with the retainer plate 54, but also at all times biasing upper portions of the latch arm 92 to the left.

*Operation*

With the helmet properly positioned over the user's head, and with the user's chin loosely projected into cup 78, a slight downward movement of the chin causes a pivotal downward movement of arm 76 about pivot 77. This transmits a counter-clockwise force through adjusting screw 81 to operating lever 82 around fixed pivot point 69. The inner end 83 transmits an upward thrust through the short link 85 to an intermediate portion of operating arm or lever 87, but spaced from the pivot point 77.

This causes a counter-clockwise upward pivotal movement of arm 87 and accordingly an upward movement of the vertical movable means 43—44. This effects a corresponding upward movement of lens 39 within the channel guides 33 out of horizontal registry with the transparent glass 29.

At the same time and during this upward movement, latch arm 92 rides along the cam guide 56 along inclined edge 57, enters slot 58 adjacent its upper end, and at the upper end of said slot and, in view of the biasing of spring 95—96, projects to the left and momentarily bears against the stop 53. The weight of the mechanism, as well as spring 89, causes a slight downward movement thereof, including the latch arm 92 and its offset 94 into the retaining notch 60, whereby the lens is retained in elevated position.

In order to release the lens 39 to permit its return to registry with glass 29, it is merely necessary to effect a second slight actuation of lever 76 through the cup 78. This, through the toggle linkage, effects a slight elevation of the latch offset 94 and, due to the spring biasing thereof, said offset moves to point 62, Fig. 2. Accordingly, just as soon as lever 76 is released, the said vertically movable means, the lens, as well as the latch offset, will move downwardly with the said offset riding in the run-out groove 63 until the said latch arm 92 assumes the initial position shown in Fig. 2, ready for the next actuation.

Having described my invention, reference should now be had to the claims which follow for determining the scope thereof.

I claim:

1. A lens control for a welding helmet having an opaque head enclosing hood with an upright apertured front wall and a bottom wall; a hollow rectangular frame projecting outwardly through said front wall aperture and including an outturned internal peripheral flange registerable with the interior wall of the hood bounding said aperture and secured thereto, said frame having a rectangular opening across its lower portion, a transparent safety glass secured in said frame at said opening, opposed upright channel guides mounted within and upon opposite sides of said frame, an elongated channel frame slidably mounted within said channels and containing a smoked lens normally registerable with said glass and vertically movable in said channels out of such registry, upright vertically movable means joined at its upper end to said channel frame, an upright elongated support joined to the interior of said front wall and projected rearwardly thereof and secured to said bottom wall, an arm pivoted at its front end upon said support and at its rear end adapted to be operatively engaged by the user's chin, a toggle linkage pivotally mounted on said support below said arm and operatively engaged thereby, the said toggle linkage being joined to the lower end of said vertically movable means, an upright retainer on said support having a central notch at its top, a cam guide upon said retainer below said notch, an elongated latch arm joined at its lower end to said vertically movable means and having an offset at its upper end movable along said cam guide on upward movement of said vertically movable means and positionable within said notch on release of said arm for retaining said lens and said vertically movable means in elevated position, the next actuation of said arm disengaging said latch from said notch, permitting on release of said arm downward movement of said lens for registry with said glass, and a coiled spring interconnecting said toggle linkage with said bottom wall, normally resisting upward movement of said lens and facilitating downward movement thereof when released from its uppermost position.

2. In a welding helmet including front and bottom walls and a transparent glass in said front wall; opposed upright channel guides mounted upon the interior of the helmet, an elongated framed smoked lens registerable with said glass with its ends slidable in said guides, vertically movable means joined at its upper end to said lens frame, an upright elongated support joined to the interior or said front wall and projected rearwardly thereof and secured to said bottom wall, an arm pivoted at its front end upon said support and at its rear end adapted to be operatively engaged by the user's chin, a toggle linkage pivotally mounted on said support below said arm and operatively engaged thereby, the said toggle linkage being joined to the lower end of said vertically movable means, an upright retainer on said support having a central notch at its top, a cam guide upon said retainer below said notch, an elongated latch arm joined at its lower end to said vertically movable means and having an offset at its upper end movable along said cam guide on upward movement of said vertically movable means and positionable within said notch on release of said arm for retaining said lens and said vertically movable means in elevated position, the next actuation of said arm disengaging said latch from said notch, permitting on release of said arm downward movement of said lens for registry with said glass, and a coiled spring inter-connecting said toggle linkage with said bottom wall, normally resisting upward movement of said lens and facilitating downward movement thereof when released from its uppermost position.

3. The lens control of claim 2, and a formed chin receiving cup secured upon the rear end of said arm, said cup being transversely apertured throughout its surface.

4. The lens control of claim 2, the lower end of said support extending above said bottom wall, and a vertically extensible upright standard interconnecting the lower end of said support and said bottom wall.

5. The lens control of claim 2, and resilient means anchored upon said toggle linkage and operatively engaging said latch arm normally urging said latch arm in one direction for cooperation with said cam guide for guiding said offset into said notch and for disengaging said offset from said notch.

6. The lens control of claim 2, said cam guide being of inverted A-shape, mounted upon said upright retainer and with the said notch therein corresponding to the top surface of said cam guide, stop means on said support projecting partially down into said notch for limiting lateral movement of said latch offset, and a coiled spring mounted on said toggle linkage operatively engaging said latch arm normally urging said arm in one direction whereby, upon an initial actuation of said chin operated arm, the said latch arm will ride upwardly along the outer surface of said cam guide and at the top thereof will be biased laterally against said stop means and into said notch, a second activation of said chin activating arm elevating said latch offset from said notch whereby said offset is further biased in the same direction, disengaging itself from the said notch permitting downward movement of said vertically movable means.

References Cited in the file of this patent
UNITED STATES PATENTS

| | | |
|---|---|---|
| 2,384,798 | Conway | Sept. 18, 1945 |
| 2,400,993 | Heberler | May 28, 1946 |
| 2,546,942 | Doran | Mar. 27, 1951 |
| 2,644,161 | Meyer | July 7, 1953 |